(12) United States Patent
Kinney et al.

(10) Patent No.: US 9,709,431 B1
(45) Date of Patent: Jul. 18, 2017

(54) WATER MANAGEMENT SENSING

(71) Applicant: Alarm.com Incorporated, Tysons, VA (US)

(72) Inventors: Abraham Joseph Kinney, Vienna, VA (US); Craig Carl Heffernan, Oregon City, OR (US); Peter Richard Williams, Arlington, VA (US); Daniel Goodman, Needham, MA (US); Bingying Qin, Los Angeles, CA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/098,564

(22) Filed: Apr. 14, 2016

Related U.S. Application Data

(60) Provisional application No. 62/147,339, filed on Apr. 14, 2015.

(51) Int. Cl.
| | |
|---|---|
| *G08B 21/00* | (2006.01) |
| *G01F 23/00* | (2006.01) |
| *E04B 1/70* | (2006.01) |
| *E04H 9/14* | (2006.01) |
| *E03F 1/00* | (2006.01) |

(52) U.S. Cl.
CPC .............. *G01F 23/00* (2013.01); *E03F 1/002* (2013.01); *E04B 1/70* (2013.01); *E04H 9/145* (2013.01)

(58) Field of Classification Search
None
See application file for complete search history.

(56) References Cited

U.S. PATENT DOCUMENTS

| | | | |
|---|---|---|---|
| 2013/0197700 A1* | 8/2013 | Kochan, Jr. ........... | F04B 49/065 700/282 |
| 2013/0241727 A1* | 9/2013 | Coulombe ............. | G08B 23/00 340/517 |
| 2014/0201315 A1* | 7/2014 | Jacob .................. | H04L 12/2803 709/217 |

* cited by examiner

*Primary Examiner* — Adolf Dsouza
(74) *Attorney, Agent, or Firm* — Fish & Richardson P.C.

(57) ABSTRACT

In some implementations, a system obtains activity data for a sump pump associated with a property where the obtained activity data indicates a present operational status of the sump pump. The system obtains water level data associated with the property where the water level data indicates a level of water within the property, determines that the activity data indicates that the sump pump is operating and that the water level within the property satisfies a water level risk threshold, and, in response to the determination that the activity data indicates that the sump pump is operating and that the water level within the property satisfies a water level risk threshold, provides a notification that the property is at risk of suffering water damage.

19 Claims, 4 Drawing Sheets

WATER MANAGEMENT SENSING

CROSS-REFERENCE TO RELATED APPLICATION

This application claims the benefit of U.S. Provisional Application No. 62/147,339, filed Apr. 14, 2015, and titled "Water Management Sensing," which is incorporated by reference in its entirety.

TECHNICAL FIELD

This disclosure relates to monitoring technology and, for example, sensors for a sump pump.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for sensors in a monitoring system. For example, techniques are described for monitoring a sump pump using sensors.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for monitoring water level and sump pump activity within a property to prevent water damage or flooding. A sump pump may be used to remove water that has accumulated in a sump basin within a property. For example, water leaking into a basement may be funneled into a sump basin, and the sump pump may pump water from the sump basin to a location where the water is no longer problematic, e.g., a municipal storm drain or a dry well. Sump pumps may operate automatically. For example, sump pumps may automatically turn on when a water level in the sump basin is above a predetermined threshold and turn off once the water is below the predetermined threshold. However, in some instances, a sump pump may be underpowered or malfunctioning so that while the sump pump is turned on, the water level in the sump basin continues to rise.

Accordingly, techniques are described to proactively identify issues with a sump pump and provide alerts regarding sump pumps. The issues may be identified by using a water level sensor to monitor a level of water for the sump pump and a sump pump sensor to monitor sump pump activity. Based on the water level and the sump pump activity, the system may determine that the sump pump is underpowered or malfunctioning and a high susceptibility of water damage within the property. In response, the system may send an alert to a property owner or a service provider. Water level sensors and sump pump sensors are examples of water management systems, but the techniques described throughout this disclosure may be applied to other types of appliances that may be monitored, such as pools, hot tubs, humidifiers, etc.

Figure 1:
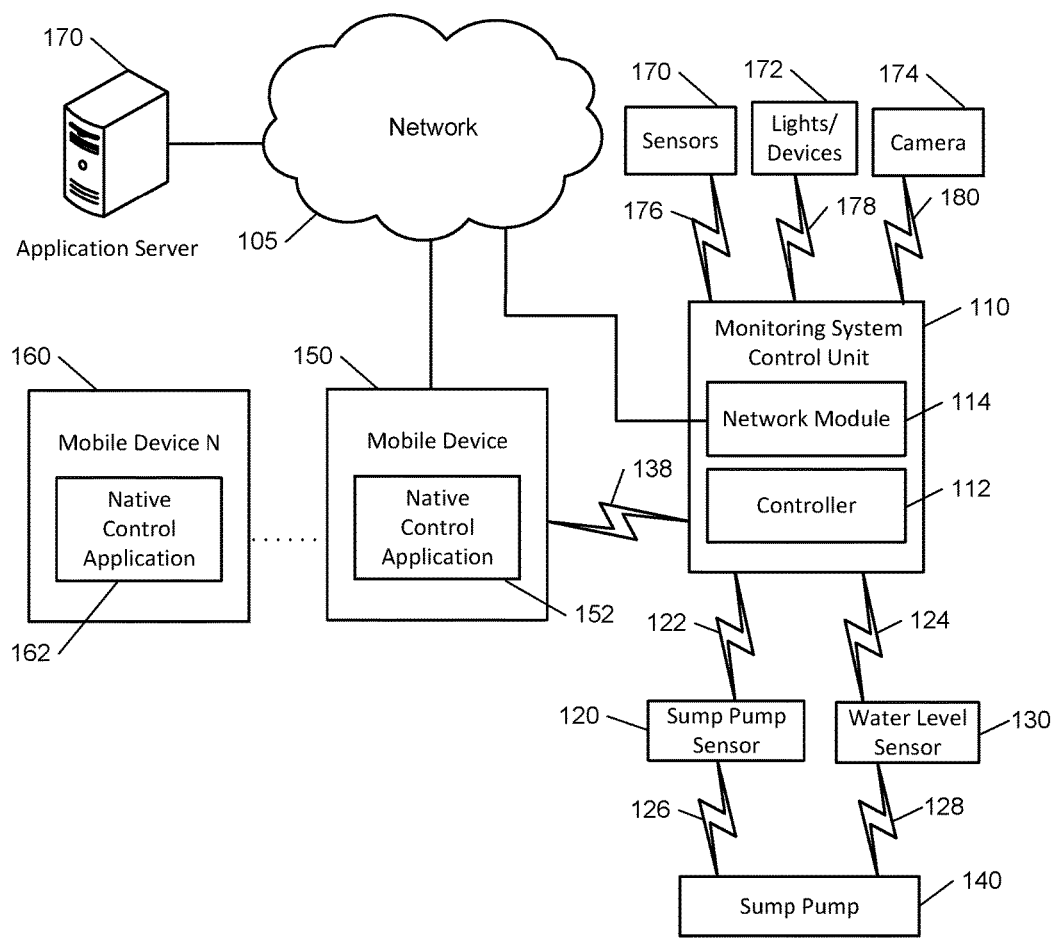
FIG. 1 illustrates an example system.

FIG. 1 illustrates an example of a control system 100 that may be configured to provide alerts based on sump pump activity within a property. The control system 100 may include a network 105, a monitoring system control unit 110, a sump pump sensor 120, a water level sensor 130, a sump pump 140, one or more mobile devices 150, 160, and an application server 170. The network 105 may be configured to enable electronic communications between devices connected to the network 105. For example, the network 105 may be configured to enable exchange of electronic communications between the monitoring system control unit 110, the one or more mobile devices 150, 160, and the application server 170.

The network 105 may include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The monitoring system control unit 110 may include a controller 112 and a network module 114. The controller 112 may be configured to control a system, e.g., a water management system associated with a property that includes the monitoring system control unit 110. In some examples, the controller 112 may include a processor or other control circuitry configured to execute instructions of a program that controls operation of a water management system. In these examples, the controller 112 may be configured to receive input from sensors, detectors, or other devices associated with the water management system and control operation of components of the water management system, e.g., a sump pump, a furnace, humidifier, dehumidifier, or air conditioner, or other devices associated with the property, e.g., an appliance, lights, etc. For example, the controller 112 may be configured to control operation of the network module 114 included in the monitoring system control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a wireless data channel. In this example, the network module 114 may transmit user location data within or external to the property, environmental data from the property, e.g., indoors at the property or outdoors at the property, or other data over a wireless data channel. The wireless communication device may include one or more GSM modules, a radio modem, a cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS). In some implementations, the alarm panel may be a broadband or cellular gateway where the network module 114 may enable the monitoring system control unit 110 to communicate over the network 105.

The monitoring system that includes the monitoring system control unit 110 includes one or more sensors or detectors. For example, the monitoring system may include multiple sensors 170. The sensors 170 may include a contact sensor, a motion sensor, a glass break sensor, or any other type of sensor included in an alarm system or security system. The sensors 170 also may include an environmental sensor, such as a temperature sensor, a water sensor, a rain sensor, a wind sensor, a light sensor, a smoke detector, a carbon monoxide detector, an air quality sensor, etc. The sensors 170 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 170 may include a radio-frequency identification (RFID) sensor that identifies a particular article that includes a pre-assigned RFID tag.

The monitoring system control unit 110 communicates with the lights/devices module 172 and the camera 174 to perform surveillance, monitoring, and/or control operations. The module 172 is connected to one or more lighting systems and/or one or more household devices (e.g., thermostat, oven, range, etc.) and is configured to control operation of the one or more lighting systems and/or the one or more household devices. The module 172 may control the one or more lighting systems and/or the one or more household devices based on commands received from the monitoring system control unit 110. For instance, the module 172 may cause a lighting system to illuminate an area to provide a better image of the area when captured by a camera 174. The module 172 also may control the one or more lighting systems and/or the one or more household devices to perform energy management and/or user convenience operations (e.g., adjusting a temperature setting of a thermostat and turning an oven off and on to meet energy management and user convenience goals).

The camera 174 may be a video/photographic camera or other type of optical sensing device configured to capture images. For instance, the camera 174 may be configured to capture images of an area within a building monitored by the monitoring system control unit 110. The camera 174 may be configured to capture single, static images of the area and also video images of the area in which multiple images of the area are captured at a relatively high frequency (e.g., thirty images per second). The camera 174 may be controlled based on commands received from the monitoring system control unit 110.

The camera 174 may be triggered by several different types of techniques. For instance, a Passive Infra Red (PIR) motion sensor may be built into the camera 130 and used to trigger the camera 174 to capture one or more images when motion is detected. The camera 174 also may include a microwave motion sensor built into the camera and used to trigger the camera 174 to capture one or more images when motion is detected. The camera 174 may have a "normally open" or "normally closed" digital input that can trigger capture of one or more images when external sensors (e.g., the sensors 170, PIR, door/window, etc.) detect motion or other events. In some implementations, the camera 174 receives a command to capture an image when external devices detect motion or another potential alarm event. The camera 174 may receive the command from the controller 112 or directly from one of the sensors 170.

In some examples, the camera 174 triggers integrated or external illuminators (e.g., Infra Red, Z-wave controlled "white" lights, lights controlled by the module 172, etc.) to improve image quality when the scene is dark. An integrated or separate light sensor may be used to determine if illumination is desired and may result in increased image quality.

The camera 174 may be programmed with any combination of time/day schedules, system "arming state", or other variables to determine whether images should be captured or not when triggers occur. The camera 174 may enter a low-power mode when not capturing images. In this case, the camera 174 may wake periodically to check for inbound messages from the controller 112. The camera 174 may be powered by internal, replaceable batteries if located remotely from the monitoring control unit 110. The camera 174 may employ a small solar cell to recharge the battery when light is available. Alternatively, the camera 174 may be powered by the controller's 112 power supply if the camera 174 is co-located with the controller 112.

The control system 100 that may include the monitoring system control unit 110 may communicate with a sump pump sensor 120 and a water level sensor 130 to monitor the operation of a sump pump 140 and generate alerts. The sump pump sensor 120 may be a sensor configured to monitor the sump pump 140 to determine whether the sump pump is turned on or turned off. The water level sensor 130 may be a sensor configured to determine a level of water for the sump pump. For example, the water level sensor 130 may be placed at a predetermined height, e.g., 1 inch or 2 inches, above a predetermined level at which the sump pump is turned on and provide a binary value indicating whether the water level sensor 130 is in contact with water, which indicates whether the water level is below or above the predetermined level by the predetermined height. The predetermined height may be a height close to the maximum capacity of the sump basin. The predetermined height may reflect a predetermined threshold. In another example, the water level sensor 130 may measure how high the water level is in the sump basin and provide a value that indicates the height of the water level.

The sump pump sensor 120, the water level sensor 130, the sensors 170, the module 172, and the camera 174 may communicate with the controller 112 over communications links 124, 126, and sump pump 140 may communicate with the sump pump sensor and the water level sensor 130 over communication links 122, 124, 126, 128, 176, 178, and 180. The communication links 122, 124, 126, and 128 may be wired or wireless data pathways configured to transmit signals between the sump pump sensor 120 and the water level sensor 130 and the controller 112, and between the sump pump 140 and the sump pump sensor 120 and the water level sensor 130. The sump pump sensor 120, the water level sensor 130 and the sump pump 140 may continuously transmit sensed values to the controller 112, may periodically transmit sensed values to the controller 112, or may transmit sensed values to the controller 112 in response to a change in a sensed value.

In some implementations, the sump pump 140 may be associated with one or more components of a water management system and may communicate directly with the monitoring system control unit 110. For example, the monitoring system control unit 110 may communicate with the sump pump 140 to send and/or receive information related to monitoring the components of the sump pump 140, information relating to the water management system components, or other information.

The monitoring system control unit 110 may monitor the operation of the sump pump based on exchanging communications with the sump pump sensor 120 and the water level sensor 130. For example, the monitoring system control unit 110 may receive sump pump activity from the sump pump sensor 120 indicating whether the sump pump 140 is turned on and receive water level information from the water level sensor 130 indicating whether the water level is above the predetermined threshold. In response to determining that the sump pump is on and the water level is above the predetermined threshold, the monitoring system control unit 110 may determine that the sump pump may be underperforming or malfunctioning and determine a high susceptibility of water damage within the property. In another example, the monitoring system control unit 110 may determine that the sump pump is on and that the water level has been rising at a quarter of an inch over ten minutes while the sump pump has been running, and in response, determine that the sump pump may be underperforming or malfunctioning and determine a high susceptibility of water damage within the property.

In response to determining that the sump pump 140 may be underperforming or malfunctioning, the monitoring system control unit 110 may automatically provide alerts to property owners. For example, the monitoring system control unit 110 may initially determine, based on data from the sump pump sensor 120 and the water level sensor 130, that the sump pump 140 may be currently incapable or will likely soon become incapable of reducing the water level within the property to prevent water damage. In response, the monitoring system control unit 110 may transmit a notification to the one or more mobile devices 150, 160 or the application server 170. In one instance, the notification may be that the sump pump 140 is on and the water level is high. In another instance, the notification may include a performance report of the sump pump 140 that indicates how long the pump has been running and the water levels before the sump pump 140 was running and after the sump pump 140 started running.

In some implementations, the monitoring system control unit 110 may determine to provide alerts based on occupancy of the property as indicated by other sensors of the control system 100. For example, when the monitoring system control unit 110 determines that the property is occupied by a person and determines to provide an alert regarding the sump pump, the monitoring system control unit 110 may provide the alert to a mobile device of the user but also one or more of announce an alert over a speaker in the property or flash the lights of the property to indicate the alert. In another example, when the monitoring system control unit 110 determines that the property is not occupied by a person and determines to provide an alert regarding the sump pump, the monitoring system control unit 110 may provide an alert to a mobile device of the user and provide an alert to a third party service provider to request that the sump pump be immediately serviced. In some implementations, the monitoring system control unit 110 may determine to provide the alert to a third party service provider after also determining that the user has previously indicated that the monitoring system control unit 110 is permitted to provide service requests to one or more particular service providers in the event of potential flooding.

In some implementations, the monitoring system control unit 110 may additionally or alternatively add an action item to an action item list that indicates that the sump pump 140 may need service. In some implementations, the monitoring system control unit 110 may compare the data generated from the property to a repository of data generated from other properties with similar water management systems to perform a trend analysis on common performance issues.

In some implementations, the monitoring system control unit 110 may dynamically monitor the state of the sump pump sensor 120 and the water level sensor 130 to determine a sump pump utilization for the sump pump 140. For example, the monitoring system control unit 110 may track the operation of the sump pump for a certain period of time and calculate the corresponding decrease in water levels within the property to determine if the sump pump 140 is efficiently removing water from the property. In this example, the sump pump utilization may represent an average time-rate volumetric reduction of water levels within the property by the operation of the sump pump 140. The monitoring system control unit 110 may then use this sump pump utilization to adjust the operation of the sump pump 140 by, for example, increasing or decreasing its pump speed, to mitigate potential water damage within the property.

In some instances, the monitoring system control unit 110 may use the sump pump utilization to determine the efficiency of the sump pump 140. For example, if the sump pump sensor 120 indicates the sump pump 140 is operational but the water level sensor 130 indicates that the water level is above a predetermined threshold, sump pump 140 may be determined to be inefficient or non-functional. In such an example, the monitoring system control unit 110 may compare the sump pump utilization of the sump pump 140 to a reference measurement to determine if the operation of the sump pump 140 is functional. In another example, the monitoring system control unit 110 may determine an anticipated sump pump utilization based on the calculated water level and adjust the reference comparison to the measured sump pump utilization. In this example, if the water level is too high, this comparison may allow the monitoring system control unit 110 to determine that the water level may have exceeded the capacity of the sump pump 140.

The application server 170 may be an electronic device configured to provide control services by exchanging electronic communications with the monitoring system control unit 110 and the one or more mobile devices 150, 160 over the network 105. For example, the application server 170 may be configured to monitor data obtained by the monitoring system control unit 110. In this example, the application server 170 may exchange electronic communications with the network module 114 included in the monitoring system control unit 110 to send and/or receive information regarding activity at the property and/or the environment at the property. The application server 170 also may receive information regarding activity within or external to the property from the one or more mobile devices 150, 160. For example, the application server 170 may receive information from the one or more mobile devices 150, 160 that indicates the locations of the one or more mobile devices 150, 160.

In some implementations, the monitoring system control unit 110 may have access to weather data and/or weather forecast data, where the weather and/or weather forecast data may be used to perform dynamic environmental control within the property. For example, the monitoring system control unit 110 may be connected to the Internet over the network 105 and may access the weather and/or weather forecast data at a website or database that is accessible on the Internet. The weather data may include current weather data, such as a current temperature, humidity, dew point, wind chill, heat index, etc., and the weather forecast data may include short and long term weather forecasts, for example, short and long term temperature forecasts, precipitation forecasts, etc. In some instances, the monitoring system control unit 110 may use weather data for providing alerts. For example, if the control unit 110 determines that the water level has already reached a predetermined threshold, the sump pump is on, a property owner has been alerted but not home and no response has been received from the property owner, and the external rain sensor indicates that heavy rain is still falling, the system 100 may then determine to provide the alert to a service provider as the risk of flooding may be very high.

The one or more mobile devices 150, 160 may be devices that host one or more native applications, e.g., the native applications 152, 162. The one or more mobile devices 150, 160 may be cellular phones or non-cellular locally networked devices. The one or more mobile devices 150, 160 may include a cell phone, a smart phone, a tablet PC, a personal digital assistant ("PDA"), or any other portable device configured to communicate over a network. For example, implementations also may include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 150, 160 may be the same or may include mobile devices of different types. The one or more mobile devices 150, 160 may perform functions unrelated to the control system 100, such as placing personal telephone calls, playing music, playing video, displaying pictures, browsing the Internet, maintaining an electronic calendar, etc.

In some implementations, the one or more mobile devices 150, 160 may communicate with and receive control system 100 data from the monitoring system control unit 110 using the communication link 138. For instance, the one or more mobile devices 150, 160 may communicate with the monitoring system control unit 110 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 150, 160 may connect locally to the control system 100 and its sensors and other devices. The local connection may improve the speed of communications because communicating through the network 105 with a remote server, e.g., the application server 170, may be slower.

Although the one or more mobile devices 150, 160 are shown communicating with the monitoring system control unit 110, the one or more mobile devices 150, 160 may communicate directly with the sensors and other devices controlled by the monitoring system control unit 110. In some implementations, the one or more mobile devices 150, 160 may replace the monitoring system control unit 110 and perform the functions of the monitoring system control unit 110 for local control and long range or offsite communication.

In other implementations, the one or more mobile devices 150, 160 may receive control system 100 data captured by the monitoring system control unit 110 through the network 105. The one or more mobile devices 150, 160 may receive the data from the monitoring system control unit 110 through the network 105 or the application server 170 and may relay data received from the monitoring system control unit 110 to the one or more mobile devices 150, 160 through the network 105. In this regard, the application server 170 may facilitate communications between the one or more mobile devices 150, 160 and the monitoring system control unit 110.

Although the one or more mobile devices 150, 160 are shown in FIG. 1 as being connected to the network 105, in some implementations, the one or more mobile devices 150, 160 are not connected to the network 105. In these implementations, the one or more mobile devices 150, 160 may communicate directly with one or more of the control system 100 components and no network connection, e.g., connection to the Internet, or reliance on remote servers is needed.

In some implementations the one or more mobile devices 150, 160 may be used in conjunction with only local sensors and/or local devices at a property. In these implementations, the control system 100 may only include the one or more mobile devices 150, 160 and the sump pump sensor 120, the water level sensor 130, and the sump pump 140. The one or more mobile devices 150, 160 may receive data directly from the sump pump sensor 120, the water level sensor 130, and the sump pump 140 and send data directly to t the sump pump sensor 120, the water level sensor 130, and the sump pump 140. The one or more mobile devices 150, 160 may provide the appropriate interfaces/processing to provide control information, modify settings, control water management system component operations, etc.

In some implementations, a mobile device 150, 160 may be able to determine a geographic location associated with the mobile device 150, 160, and may communicate information identifying a geographic location associated with the mobile device 150, 160. For example, a mobile device 150, 160 may determine the current geographic location of the mobile device 150, 160 by using global positioning system (GPS) capabilities. In other implementations, a geographic location associated with a mobiles device 150, 160 may be determined using other methods, for example, by using Wi-Fi access point triangulation data, cellular network triangulation data, or IP address information, when the mobile device 150, 160 has network connectivity. The mobile device 150, 160 may transmit data identifying the geographic location of the mobile device 150, 160 over the network 105 to the application server 170, or to the monitoring system control unit 110.

The one or more mobile devices 150, 160 may each include a native application 152, 162, respectively. The native application 152, 162 refers to a software/firmware program running on the corresponding mobile devices that enables the features below. The one or more mobile devices 150, 160 may load or install the native application 152, 162 based on data received over a network or data received from local media. The native monitoring application 152, 162 may run on mobile devices' platforms, such as Apple iOS, iPhone, iPod touch, Blackberry, Google Android, Windows Mobile, etc.

The native application identifies a geographic location associated with the mobile device 150, 160 and communicates information identifying the geographic location. For example, a mobile device 150, 160 having the native application 152, 162 may determine a geographic location of the mobile device 150, 160 using GPS capabilities, and may communicate data identifying the geographic location to the application server 170. In some instances, the native application 152, 162 may check the location of the mobile device 150, 160 periodically and may automatically detect when a user associated with the mobile device 150, 160 is going toward or away from a property.

In some implementations, the monitoring system 110 of the property may exchange communications with the application server 170 to receive data transmissions indicating other sump pump activity and water level information in nearby properties within the neighborhood where the property may be location. For example, the application server 170 may receive information from neighboring properties that indicate that both sump pumps are turned on but the water level is high, which may indicate that major water leak may be impacting both properties. In another example, if there is a community pipe burst that impacts multiple nearby properties within a certain location (e.g., five mile radius), the control systems of the property may transmit a signal to the application server 170 indicating that there was a leakage event. The monitoring system control unit 110 may receive a transmission identifying the pipe burst from the application server 170 and in response, may increase the susceptibility of water damage calculated from the water level and the operation of the sump pump 140. In these implementations, the monitoring system 110 may also control the operation of appliances within the property in response to determining that there may be a localized event that impacts the susceptibility of the property to water damage.

In some implementations, the control system 100 may obtain run-off characteristics of the property. Run-off characteristics may include lot size, grading, roof information, gutter information and other information related to run-off. The control system 100 may use the run-off characteristics to determine when to send an alert, e.g., determine a threshold, or provide a theoretical load for the sump pump 140, e.g., determine the sump basin will likely receive two gallons a minute under a certain amount of rain. The control system 100 may provide suggestions or referrals for improvements based on these determinations. For example, the control system may suggest making changes to the grading of the lawn or location of the gutters to direct more water away from the home.

In some implementations, the control system 100 enables dynamic environmental control within a property by analyzing activity data and weather data, to control the water management system of the property based on the analysis. For example, the control system 100 may include a rain sensor that associates precipitation data with the performance of the sump pump 140, the sump pump sensor 120, and the water level sensor 130. In some instances, the precipitation data may be analyzed at the monitoring system control unit 110 and, based on the analysis, the monitoring system control unit 110 may control the sump pump 140 to reduce susceptibility to water damage within the property during heavy precipitation.

In some examples, the activity data may include the current sump pump utilization of the sump pump 140, the current and previous water levels detected by the water level sensor 130, and the activity of the sump pump 140 detected by the sump pump sensor 120. The environmental data may include expected local precipitation or expected water level increase within the property based on the precipitation.

Figure 2:
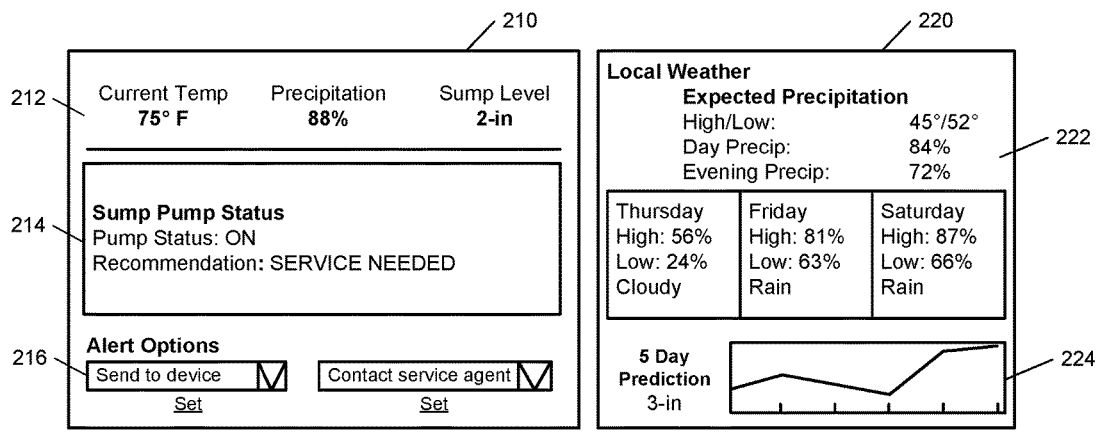
FIG. 2 illustrates example interfaces for presenting and sending information relating to a sump pump.
Figure 2:
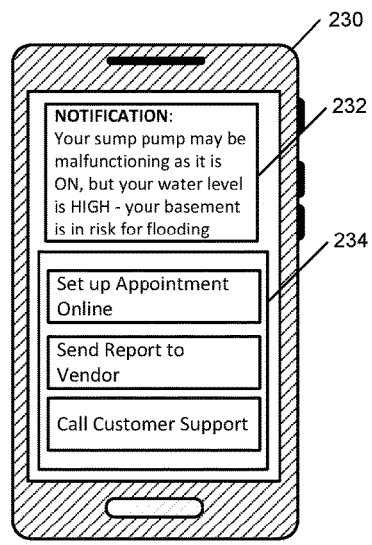

FIG. 2 illustrates an example interfaces for presenting and sending information relating to susceptibility to water damage within a property. For example, the interface 210 may include a system settings 212, a sump pump status 214 and alert options 216. In another example, the interface 220 may include a local weather 222, and a rainfall prediction 224. In the last example, a mobile device 230 may receive a notification 232, and alert options 234.

The interface 210 may be an electronic interface on the monitoring system control unit 110 that enables the control system 100 to monitor the status of the sump pump 140 and receive information about the water management system within the property. For example, the system settings 212 may show the current ambient temperature within the property, the probability of precipitation in the environment near the property, and the water level for the sump basin within the property. The control system 100 may determine these values displayed in the system settings 212 based on exchanging communications with components of the water management system within the property (e.g., an internal thermometer, an external rain sensor, or the water level sensor 130).

The sump pump status 214 may display the current activity settings of the sump pump 140 within the property. For example, as represented in FIG. 2, the sump pump status 214 may show "ON" if the sump pump is currently functioning to remove water from the sump basin as opposed to simply receiving power without actively pumping water. The sump pump status 214 may also include a service recommendation, determined by the control system 100 based on data received from the sump pump sensor 120 and the water level sensor 130. For example, the control system 100 may initially compare the current water level to a predetermined threshold. The monitoring system may then monitor the status of the sump pump 140, and if it is operational while the water level stays above the threshold or reaches a higher threshold, the control system 100 may determine that the sump pump may be performing underperforming or currently non-functional. In these instances, the sump status 214 may display "SERVICE NEEDED" to indicate to the property owner that the property is susceptible to water damage.

The sump pump status 216 may also include alert options 216, which may allow a property owner to take action after receiving a recommendation to service the sump pump 140. For example, as indicated in FIG. 2, the property owner may forward a notification to a mobile device, or contact a service agent directly to schedule a service appointment. In other implementations not represented in FIG. 2, the property owner may also have the ability to receive a performance report of the sump pump 140 that summarizes the activity of the sump and its pump utilization over a certain time frame (e.g., when it has been turned on and off during the last six months).

The interface 220 may include local weather 222, which shows the expected precipitation within a local environment where a property may be located. For example, as represented in FIG. 2, the local weather 222 may include a three day forecast of a range of predicted precipitation as well as a forecast of the weather. In this example, the control system 100 may use the forecast predictions to determine if the there is a high chance of expected rainfall that may impact the activity of the sump pump 140. In some implementations, the control system 100 may generate weather information displayed in the interface 220 by retrieving information from an online weather forecast.

In other implementations, the control system 100 may generate weather information by exchanging communications with an external rain sensor located near the exterior of the property and configured to track precipitation information such as time periods of precipitation, amount of precipitation and forecast of precipitation. For instance, the external rain sensor may associate local precipitation information with the activity of the sump pump 140 to determine if the property may be susceptible to flooding. For example, if the water level has already reached a predetermined threshold, the sump pump is on, a property owner has been alerted but no response has been received, and the external rain sensor indicates that heavy rain is still falling, the control system 100 may then determine to provide the alert to a service provider as the risk of flooding may be very high. In other examples, the control system 100 may calculate additional drainage necessary to prevent water damage within the property based on the predicted rain precipitation from the rain sensor.

In some implementations, the control system 100 may adjust other components of the water management system in response to determining that the property may be susceptible to water damage. For example, if the external rain sensor indicates a high local precipitation, the control system 100 may disable other operations (e.g., lawn irrigation systems) that may increase the susceptibility of water damage. In another example, the control system 100 may determine if these operations are causing water leaks based on determining that there is no external precipitation. In this example, if the rain sensor indicates that there is no local precipitation, but that there are water levels above a threshold, the control system 100 may track property operations to determine if there is a problematic operation that may be causing water leakage within the property. In a particular example, the control system 100 may determine there may be a leak in a lawn irrigation system and turn off the lawn irrigation system, or determine there may be a leak somewhere in the home water system and turn off the main water valve.

The interface 220 may also include a rainfall prediction 224 that shows the expected rainfall within a certain time period (e.g., five days) and a graphical representation of the expected rainfall over the certain time period. As represented in FIG. 2, the rainfall prediction 224 may display an average rainfall over a five day period and a corresponding five day graph showing expected rainfall. In some instances, the control system 100 may use this average rainfall value to determine the susceptibility that the property may be susceptible to water damage. For example, if the rainfall prediction 224 indicates that there is a high amount of rainfall within a certain time period (e.g., six inches over four days), the control system 100 may determine that there is a high susceptibility that some of the precipitation may cause water leakage within the property. In another example, the monitoring system control unit may utilize this rainfall prediction to intelligently determine the expected increase in sump level and provide a notification to a user to ensure that the sump pump 140 is functionally operating.

The mobile device 230 may be the one or more mobile devices 150, 160 as illustrated in FIG. 1. For example, the mobile device 230 may be used by the property owner to receive alerts and notifications about the sump pump 140. For instance, in response to determining that the sump pump 140 may be performing underperforming or may be non-functional, the control system 100 may transmit the notification 232 to the property owner indicating that the property may be susceptible to water damages. The property owner may also receive a set of alert options 234 to take further action in response to the notification 232. For example, as represented in FIG. 2, the user may set up an appointment online with a manufacturer or vendor of the sump pump 140 to schedule a service appointment, the user may send a performance report of the sump pump 140 directly to the vendor or manufacturer, or call customer support to schedule a service appointment.

In some implementations, the control system 100 may also send a corresponding alert directly to the vendor or manufacturer of the sump pump 140 in addition to sending a notification to the mobile device 230. For example, the control system 100 may determine, based on the data received from the sump pump sensor 120 and the water level sensor 130, that the sump pump is experiencing power issues, e.g., underpowered, because the sump pump sensor indicates that the sump pump 140 is on but the water level is also above a threshold value. In this example, the control system 100 may transmit a signal to the application server 170, which may route an instruction to a vendor or manufacturer to contact the property owner or provide service without input from the property owner. In other examples, the control system 100 may handle the alerts to the application server 170 based on the severity of the performance issues detected by the control system 100. For instance, if the risk of water damage is high enough, the control system 100 may redundantly transmit alerts to both the property owner and service providers to reduce the time frame of scheduling a service appointment.

Figure 3:
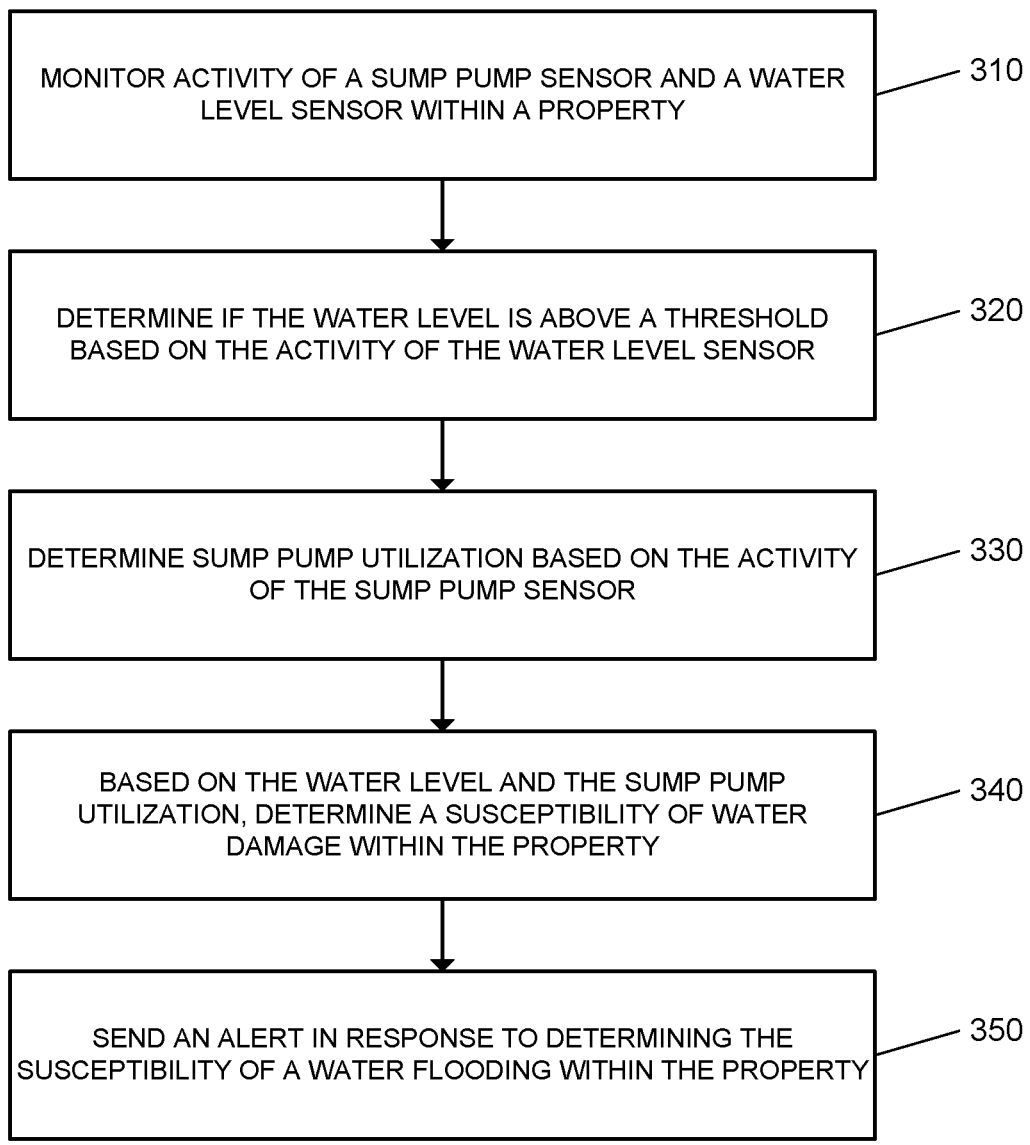
FIGS. 3 and 4 are flow charts of example processes.

FIG. 3 illustrates an example process 300 that may be used for providing alerts based on water level and sump pump activity. Although the operations of the example process 300 are described generally as being performed by the control system 100, the operations of the example process 300 may also be performed by one of the components of the control system 100 (e.g., the monitoring system control unit 110) or may be performed by any combination of the components of the control system 100. In some implementations, operations of the example process 300 may be performed by one or more processors included in one or more electronic devices.

The control system 100 may monitor activity of a sump pump sensor and a water level sensor within a property (310). For example, the monitoring system control unit 110 may receive data from the sump pump sensor 120 and the water level sensor 130. The sump pump sensor 120 may transmit data indicating whether the sump pump 140 is turned on or turned off. The water level sensor 130 may transmit data indicating the surface water level within a specified location (e.g, a sump basin within a basement) within the property where the monitoring system control unit 110 may be located. The monitoring system control unit 110 may exchange communications with the sump pump sensor 120 and the water level sensor 130 periodically (e.g., hourly, daily, or weekly), or in response to an external event that may impact the performance of the sump pump 140 (e.g., rain sensor detecting increased local precipitation).

The control system 100 may determine if the water level is above a threshold based on the activity of the water level sensor (320). For example, the water level sensor 130 may compare the measured water level to a predetermined threshold that corresponds to a maximum water level corresponding to a maximum capacity for the sump basin. In some implementations, the predetermined threshold is predetermined for a particular sump pump. For example, the predetermined threshold may be one inch below a top of the sump basin. In another implementation, the control system 100 may determine the predetermined threshold based on prior measurements within the property, or by determining an appropriate threshold based on the specific attributes of the property such as the square footage, basement depth, and number of floors of the property. In some implementations, the control system 100 may adjust the predetermined threshold based on external weather patterns that may increase or decrease the susceptibility to water damage. For example, if there is a seasonal weather pattern shift that indicates a lower likelihood of precipitation, the control system 100 may increase the predetermined threshold for the water level sensor 130 based on determining that the susceptibility to water damage is reduced given the current weather patterns. In another example, if there is increased local precipitation, the control system 100 may similarly decrease the predetermined threshold since there may be a greater likelihood of water damage leading to water damage within the property.

The control system 100 determines sump pump utilization based on the activity of the sump pump sensor (330). For example, the sump pump sensor 120 may determine if the sump pump 140 is currently turned on or turned off.

The control system 100 may determine a high susceptibility of water damage within the property based on the water level and the sump pump utilization (340). For example, the control system 100 may combine the data transmitted by the sump pump sensor 120 and the water level sensor 130 to determine how the current water level and sump pump operation may reflect a likelihood that the property may experience water damage. For instance, if the sump pump utilization indicates that the sump pump is turned on but the water level has reached a particular threshold level, the control system 100 may determine that the sump pump 140 may be malfunctioning and/or not capable of adequately reducing the water level to prevent water damage. In such an instance, the control system 100 may determine that the property may have a high susceptibility to water damage.

In some implementations, the control system 100 may adjust the calculated susceptibility of water damage based on the operation of other components within the water management system of the property or due to external weather circumstances of the location where the property may be located. In one example, if there are other appliances that may increase the likelihood of a water leakage within the property (e.g., lawn irrigation system, washing machines), the control system 100 may factor in probabilities associated with the operation of these appliances to increase the calculated susceptibility to water damage based on the water level and the sump pump activity. In another example, the control system 100 may include a rain sensor that generates local precipitation data of the location where the property is location. In this example, if the rain sensor indicates that there is excessive local precipitation, the calculated susceptibility of water damage may be increased based on determining that the likelihood of water leaking into the property is much higher.

The control system 100 may send an alert in response to determining the high susceptibility of water damage within the property (350). For example, the control system 100 may transmit a notification to one or more mobile devices 150, 160 that may be associated with the property owner. In this example, the control system 100 may include a message, as shown in FIG. 2, notifying the property owner that sump pump may be underpowered or malfunctioning and the property may be in risk of water damage. In another example, the control system 100 may transmit a notification to a third party service provider of the water management system within the property to schedule an appointment to service the sump pump.

Figure 4:
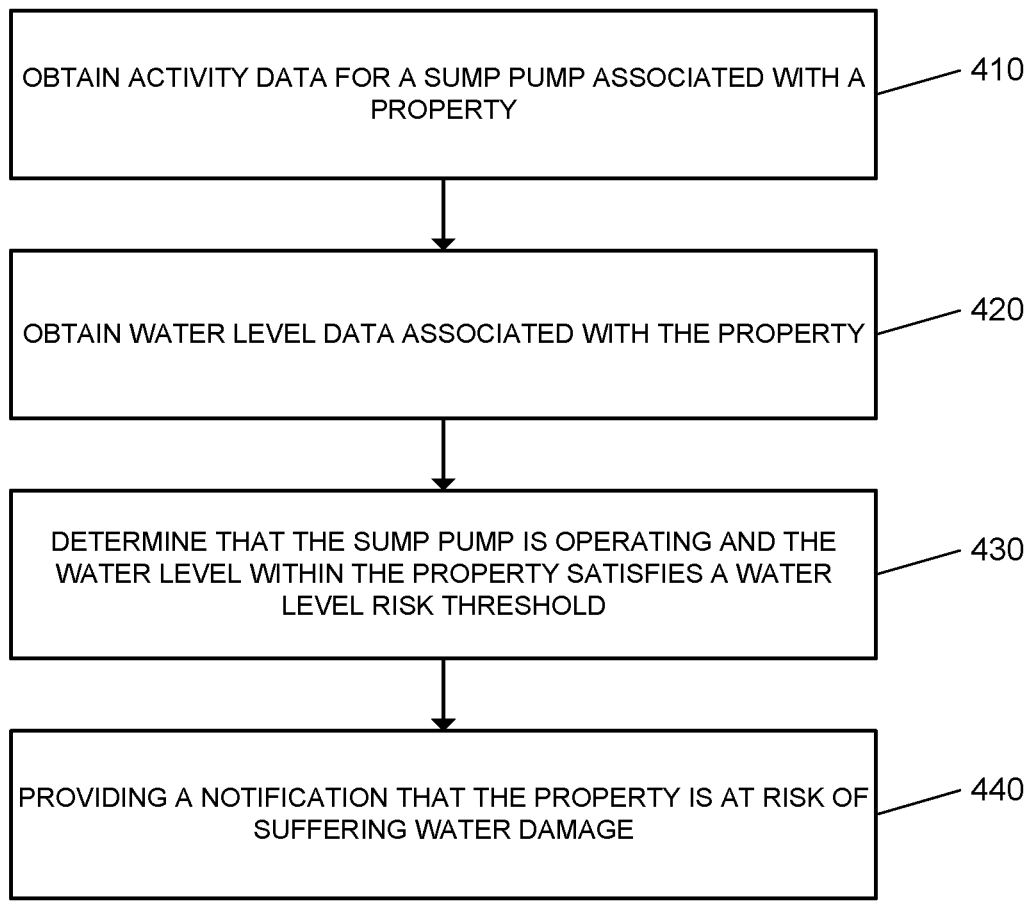

FIG. 4 illustrates an example process 400 that may be used for providing alerts based on water level and sump pump activity. Although the operations of the example process 400 are described generally as being performed by the control system 100, the operations of the example process 400 may also be performed by one of the components of the control system 100 (e.g., the monitoring system control unit 110) or may be performed by any combination of the components of the control system 100. In some implementations, operations of the example process 400 may be performed by one or more processors included in one or more electronic devices.

The control system 100 may obtain activity data for a sump pump associated with a property (410). For example, the monitoring system control unit 110 may receive activity data from the sump pump sensor 120 that indicates an operational state of the sump pump. The operational states may include a state of currently pumping, e.g., turned on, and a state of not currently pumping, e.g., turned off. As described previously, the activity data may be provided by the sump pump sensor 120 to the control unit 110 at predetermined intervals without a request from the control unit 110 or provided by the sump pump sensor 120 in response to a request from the control unit 110 for the activity data, e.g., a request provided in response to a physical rain sensor on the property indicating that rain is detected.

The control system 100 may obtain water level data associated with the property (420). For example, the monitoring system control unit 110 may receive water level data associated with the property from the water level sensor 130. The water level data may indicate a surface water level within a specified location (e.g, a sump basin within a basement) within the property where the monitoring system control unit 110 may be located. For example, the water level data may indicate a particular height of surface water level or indicate that the surface water level is at or above the particular height. As described previously, the water level data may be provided by the water level sensor 130 to the control unit 110 at predetermined intervals without a request from the control unit 110, provided by the water level sensor 130 in response to a request from the control unit 110 for the activity data, or provided by the water level sensor 130 to the control unit 110 in response to the water level sensor 130 determining that the water surface level has reached a particular water level.

The control system 100 may determine that the activity data indicates that the sump pump is operating and that the water level within the property satisfies a water level risk threshold (430). For example, the control unit 110 may determine from the activity data that the sump pump is pumping water and determine from the water level data that the water level is at or above a water level risk threshold. In some implementations, the control unit 110 may determine that the water level is at or above a water level risk threshold because the water level sensor 130 provided water level data or based on determining that a particular measured water level is at or above the water level risk threshold.

The control system 100 may provide a notification that the property is at risk of suffering water damage (440). For example, in response to a determination that the sump pump is pumping water and the water level is at or above a water level risk threshold, the control unit 110 may provide the notification shown in FIG. 2 that includes "NOTIFICATION: Your sump pump may be malfunctioning as it is ON, but your water level is HIGH—your basement is in risk for flooding," or provide some other notification.

In some implementations, the control unit 110 may provide the notification solely in response to the determination that the activity data indicates that the sump pump is operating and that the water level within the property satisfies a water level risk threshold. In some implementations, the control unit 110 may provide the notification in response to a further determination of a water damage susceptibility score, a determination that the water damage susceptibility score satisfies a water damage susceptibility threshold, and in response to determining that the water damage susceptibility score satisfies a water damage susceptibility threshold, providing the notification. The control unit 110 may calculate the water damage susceptibly score based on the operation of other components within the water management system of the property or due to external weather circumstances of the location where the property may be located. In one example, if there are other appliances that may increase the likelihood of a water leakage within the property (e.g., lawn irrigation system, washing machines), the control unit 110 may factor in probabilities associated with the operation of these appliances to increase the calculated susceptibility to water damage based on the water level and the sump pump activity. In another example, the control unit 110 may include a rain sensor that generates local precipitation data of the location where the property is location. In this example, if the rain sensor indicates that there is excessive local precipitation, the calculated susceptibility of water damage may be increased based on determining that the likelihood of water leaking into the property is much higher.

As shown in FIG. 2, the notification may include additional options for a recipient, e.g., the property owner, to set up an appointment to have their sump pump serviced or call for customer support regarding their sump pump, or request for the control system 100 to perform some other follow-up action. In response to receiving a selection of an option for a follow-up action, the control unit 110 may include relevant information for the follow-up action. For example, in response to a property owner selecting an option to set up an appointment, the control unit 110 may include information regarding past activity data for the sump pump and past water level data in the request for a third party to analyze the past activity data and past water level data to determine a potential issue with the sump pump and an urgency of addressing the potential issue. In some implementations, the notification may include suggestions or recommendations to reduce the risk of water damage. For example, as discussed above, the control unit 110 may obtain run-off characteristics of the property and suggest changes to the grading of the lawn or location of the gutters to direct more water away from the home.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
   detecting an occurrence of an event that is impactful to performance of a sump pump associated with a property;
   in response to detecting the occurrence of the event that is impactful to performance of the sump pump, providing a request to a sump pump sensor for activity data;
   obtaining the activity data for the sump pump associated with the property, the obtained activity data indicating a present operational status of the sump pump;
   obtaining water level data associated with the property, the water level data indicating a level of water within the property;

determining that the activity data indicates that the sump pump is operating and that the water level within the property satisfies a water level risk threshold; and in response to determining that the activity data indicates that the sump pump is operating and that the water level within the property satisfies a water level risk threshold, providing a notification that the property is at risk of suffering water damage.

2. The method of claim 1, wherein obtaining activity data for a sump pump associated with a property comprises:

obtaining activity data from a sump pump sensor that indicates whether the sump pump is currently pumping or not currently pumping.

3. The method of claim 1, wherein obtaining water level data associated with the property comprises:

obtaining water level data from a water level sensor that indicates whether water has reached the water level sensor.

4. The method of claim 1, wherein determining that the activity data indicates that the sump pump is operating and that the water level within the property satisfies a water level risk threshold comprises:

determining that the activity data indicates that the sump pump is pumping water and that the water level within the property is at or above the water level risk threshold.

5. The method of claim 1, comprising:

obtaining weather data associated with the property; and
determining the water level risk threshold based on the weather data.

6. The method of claim 1, wherein providing a notification that the property is at risk of suffering water damage comprises:

providing, by a monitoring server, a notification to a mobile device of an owner of the property.

7. The method of claim 1, wherein detecting an occurrence of an event that is impactful to performance of the sump pump comprises detecting an increase in precipitation associated with the property.

8. The method of claim 1, wherein determining that the activity data indicates that the sump pump is operating and that the water level within the property satisfies a water level risk threshold comprises:

determining that the activity data indicates that the sump pump is pumping water and that the water level within the property is at or above the water level risk threshold.

9. A computer-implemented method comprising:

obtaining activity data for a sump pump associated with a property, the obtained activity data indicating a present operational status of the sump pump;

obtaining water level data associated with the property, the water level data indicating a level of water within the property;

determining that the activity data indicates that the sump pump is operating and that the water level within the property satisfies a water level risk threshold;

in response to determining that the activity data indicates that the sump pump is operating and that the water level within the property satisfies a water level risk threshold, providing a notification that the property is at risk of suffering water damage;

obtaining weather data associated with the property; and
determining the water level risk threshold based on the weather data, wherein determining the water level risk threshold based on the weather data comprises:

determining that the weather data indicates an amount of rainfall during a period of time; and reducing the water level risk threshold from a predetermined default threshold based on the amount of rainfall during the period of time.

10. A computer-implemented method comprising:

obtaining activity data for a sump pump associated with a property, the obtained activity data indicating a present operational status of the sump pump;

obtaining water level data associated with the property, the water level data indicating a level of water within the property;

obtaining irrigation system data associated with the property;

determining a water level risk threshold based on the irrigation system data;

determining that the activity data indicates that the sump pump is operating and that the water level within the property satisfies the water level risk threshold; and in response to determining that the activity data indicates that the sump pump is operating and that the water level within the property satisfies the water level risk threshold, providing a notification that the property is at risk of suffering water damage.

11. A computer-implemented method comprising:

obtaining activity data for a sump pump associated with a property, the obtained activity data indicating a present operational status of the sump pump;

obtaining water level data associated with the property, the water level data indicating a level of water within the property;

determining that the activity data indicates that the sump pump is operating and that the water level within the property satisfies a water level risk threshold; and in response to determining that the activity data indicates that the sump pump is operating and that the water level within the property satisfies a water level risk threshold, providing a notification that the property is at risk of suffering water damage, wherein providing a notification that the property is at risk of suffering water damage comprises:

in response to determining that the activity data indicates that the sump pump is operating and that the water level within the property satisfies a water level risk threshold, determining a water damage susceptibility score;

determining that the water damage susceptibility score satisfies a water damage susceptibility threshold; and in response to determining that the water damage susceptibility score satisfies a water damage susceptibility threshold, providing the notification.

12. A system comprising:

one or more computers and one or more storage devices storing instructions that are operable, when executed by the one or more computers, to cause the one or more computers to perform operations comprising:

detecting an occurrence of an event that is impactful to performance of a sump pump associated with a property;

in response to detecting the occurrence of the event that is impactful to performance of the sump pump, providing a request to a sump pump sensor for activity data;

obtaining the activity data for the sump pump associated with the property, the obtained activity data indicating a present operational status of the sump pump;

obtaining water level data associated with the property, the water level data indicating a level of water within the property;

determining that the activity data indicates that the sump pump is operating and that the water level within the property satisfies a water level risk threshold; and in response to determining that the activity data indicates that the sump pump is operating and that the water level within the property satisfies a water level risk threshold, providing a notification that the property is at risk of suffering water damage.

13. The system of claim 12, wherein obtaining activity data for a sump pump associated with a property comprises:
obtaining activity data from a sump pump sensor that indicates whether the sump pump is currently pumping or not currently pumping.

14. The system of claim 12, wherein obtaining water level data associated with the property comprises:
obtaining water level data from a water level sensor that indicates whether water has reached the water level sensor.

15. The system of claim 12, the operations comprising:
obtaining weather data associated with the property; and
determining the water level risk threshold based on the weather data.

16. The system of claim 12, wherein providing a notification that the property is at risk of suffering water damage comprises:
providing, by a monitoring server, a notification to a mobile device of an owner of the property.

17. A system comprising:
one or more computers and one or more storage devices storing instructions that are operable, when executed by the one or more computers, to cause the one or more computers to perform operations comprising:
obtaining activity data for a sump pump associated with a property, the obtained activity data indicating a present operational status of the sump pump;
obtaining water level data associated with the property, the water level data indicating a level of water within the property;
determining that the activity data indicates that the sump pump is operating and that the water level within the property satisfies a water level risk threshold;
in response to determining that the activity data indicates that the sump pump is operating and that the water level within the property satisfies a water level risk threshold, providing a notification that the property is at risk of suffering water damage;
obtaining weather data associated with the property; and
determining the water level risk threshold based on the weather data,
wherein determining the water level risk threshold based on the weather data comprises:
determining that the weather data indicates an amount of rainfall during a period of time; and
reducing the water level risk threshold from a predetermined default threshold based on the amount of rainfall during the period of time.

18. A system comprising:
one or more computers and one or more storage devices storing instructions that are operable, when executed by the one or more computers, to cause the one or more computers to perform operations comprising:
obtaining activity data for a sump pump associated with a property, the obtained activity data indicating a present operational status of the sump pump;
obtaining water level data associated with the property, the water level data indicating a level of water within the property;
obtaining irrigation system data associated with the property;
determining a water level risk threshold based on the irrigation system data;
determining that the activity data indicates that the sump pump is operating and that the water level within the property satisfies the water level risk threshold;
in response to determining that the activity data indicates that the sump pump is operating and that the water level within the property satisfies the water level risk threshold, providing a notification that the property is at risk of suffering water damage.

19. A system comprising:
one or more computers and one or more storage devices storing instructions that are operable, when executed by the one or more computers, to cause the one or more computers to perform operations comprising:
obtaining activity data for a sump pump associated with a property, the obtained activity data indicating a present operational status of the sump pump;
obtaining water level data associated with the property, the water level data indicating a level of water within the property;
determining that the activity data indicates that the sump pump is operating and that the water level within the property satisfies a water level risk threshold; and
in response to determining that the activity data indicates that the sump pump is operating and that the water level within the property satisfies a water level risk threshold, providing a notification that the property is at risk of suffering water damage,
wherein providing a notification that the property is at risk of suffering water damage comprises:
in response to determining that the activity data indicates that the sump pump is operating and that the water level within the property satisfies a water level risk threshold, determining a water damage susceptibility score;
determining that the water damage susceptibility score satisfies a water damage susceptibility threshold; and
in response to determining that the water damage susceptibility score satisfies a water damage susceptibility threshold, providing the notification.

* * * * *